US012571367B2

(12) United States Patent
Henrichsen et al.

(10) Patent No.: US 12,571,367 B2
(45) Date of Patent: Mar. 10, 2026

(54) MANUFACTURING A WIND TURBINE BLADE WITH BUTT JOINTED PLANKS

(71) Applicant: Siemens Gamesa Renewable Energy A/S, Brande (DK)

(72) Inventors: Soeren Randrup Daugaard Henrichsen, Vodskov (DK); Jens Grandjean Joergensen, Aalborg (DK)

( * ) Notice: Subject to any disclaimer, the term of this patent is extended or adjusted under 35 U.S.C. 154(b) by 0 days.

(21) Appl. No.: 18/714,014

(22) PCT Filed: Nov. 15, 2022

(86) PCT No.: PCT/EP2022/081915
§ 371 (c)(1),
(2) Date: May 28, 2024

(87) PCT Pub. No.: WO2023/099200
PCT Pub. Date: Jun. 8, 2023

(65) Prior Publication Data
US 2025/0067243 A1      Feb. 27, 2025

(30) Foreign Application Priority Data
Dec. 1, 2021      (EP) ..................................... 21211701

(51) Int. Cl.
*F03D 1/06* (2006.01)

(52) U.S. Cl.
CPC ......... *F03D 1/0679* (2023.08); *F03D 1/0675* (2013.01); *F03D 1/0677* (2023.08);
(Continued)

(58) Field of Classification Search
CPC .... F03D 1/0675; F03D 1/0681; F03D 1/0679; F03D 1/0677; Y02E 10/72; B29C 66/721; B29C 66/1142
See application file for complete search history.

(56) References Cited

U.S. PATENT DOCUMENTS

| | | | | |
|---|---|---|---|---|
| 7,922,454 B1 * | 4/2011 | Riddell | ................... | F03D 80/30 |
| | | | | 416/224 |
| 8,382,440 B2 * | 2/2013 | Baker | ................... | B29C 70/304 |
| | | | | 416/226 |

(Continued)

FOREIGN PATENT DOCUMENTS

| | | | | | |
|---|---|---|---|---|---|
| CN | 101749181 B | * | 6/2013 | .......... | F03D 1/0675 |
| CN | 110268155 A | * | 9/2019 | ............ | B29C 70/48 |

(Continued)

OTHER PUBLICATIONS

English translation of DE102010015392A1 (Year: 2010).*
(Continued)

*Primary Examiner* — Courtney D Heinle
*Assistant Examiner* — Wesley Le Fisher

(57) ABSTRACT
A wind turbine blade is provided, including two planks joined with each other in a longitudinal direction of the planks at joining surfaces by a butt joint, wherein each plank includes a main portion with a wedge-shaped recess and a wedge-shaped portion filling the recess, each wedge-shaped portion has a respective one of the joining surfaces and is tapered from its joining surface in a direction away from its joining surface, and a stiffness of a material of the wedge-shaped portions is smaller than a stiffness of a material of the main portions. By having the wedge-shaped portions, the load is transferred to the surrounding material over a larger area which reduces the stress concentration.

16 Claims, 5 Drawing Sheets

(52) U.S. Cl.

CPC ..... *F05B 2240/302* (2013.01); *F05B 2240/40* (2013.01); *F05B 2250/292* (2013.01)

(56) References Cited

U.S. PATENT DOCUMENTS

| | | | | |
|---|---|---|---|---|
| 10,605,227 | B2 * | 3/2020 | Johnson | F03D 1/0675 |
| 11,015,573 | B2 | 5/2021 | Bech | |
| 11,028,825 | B2 * | 6/2021 | Hunter | F03D 1/0675 |
| 11,920,556 | B2 * | 3/2024 | Bech | F03D 1/0675 |
| 12,078,143 | B2 * | 9/2024 | Buchbjerg | B29C 66/1142 |
| 2003/0138290 | A1 | 7/2003 | Wobben | |
| 2013/0129518 | A1 | 5/2013 | Hayden et al. | |
| 2018/0298879 | A1 * | 10/2018 | Johnson | B29C 65/002 |
| 2019/0032634 | A1 | 1/2019 | Monreal Lesmes et al. | |
| 2021/0115893 | A1 * | 4/2021 | Rinck | F03D 1/0675 |
| 2023/0407838 | A1 * | 12/2023 | Tan | B29C 65/54 |

FOREIGN PATENT DOCUMENTS

| | | | | | |
|---|---|---|---|---|---|
| CN | 109312623 | B | | 10/2021 | |
| DE | 102010015392 | A1 | * | 10/2011 | ........... F03D 1/0658 |
| JP | 2003518586 | A | | 6/2003 | |
| JP | 2013533941 | A | | 8/2013 | |
| WO | 2006002621 | A1 | | 1/2006 | |
| WO | WO-2015003713 | A1 | * | 1/2015 | ............ F03D 1/065 |
| WO | 2015189338 | A1 | | 12/2015 | |
| WO | WO-2021008665 | A1 | * | 1/2021 | ........... F03D 1/0675 |

OTHER PUBLICATIONS

English translation of CN110268155A (Year: 2019).*

English translation of CN101749181B (Year: 2013).*

PCT International Search Report & Written Opinion mailed Mar. 27, 2023 corresponding to PCT International Application No. PCT/EP2022/081915.

* cited by examiner

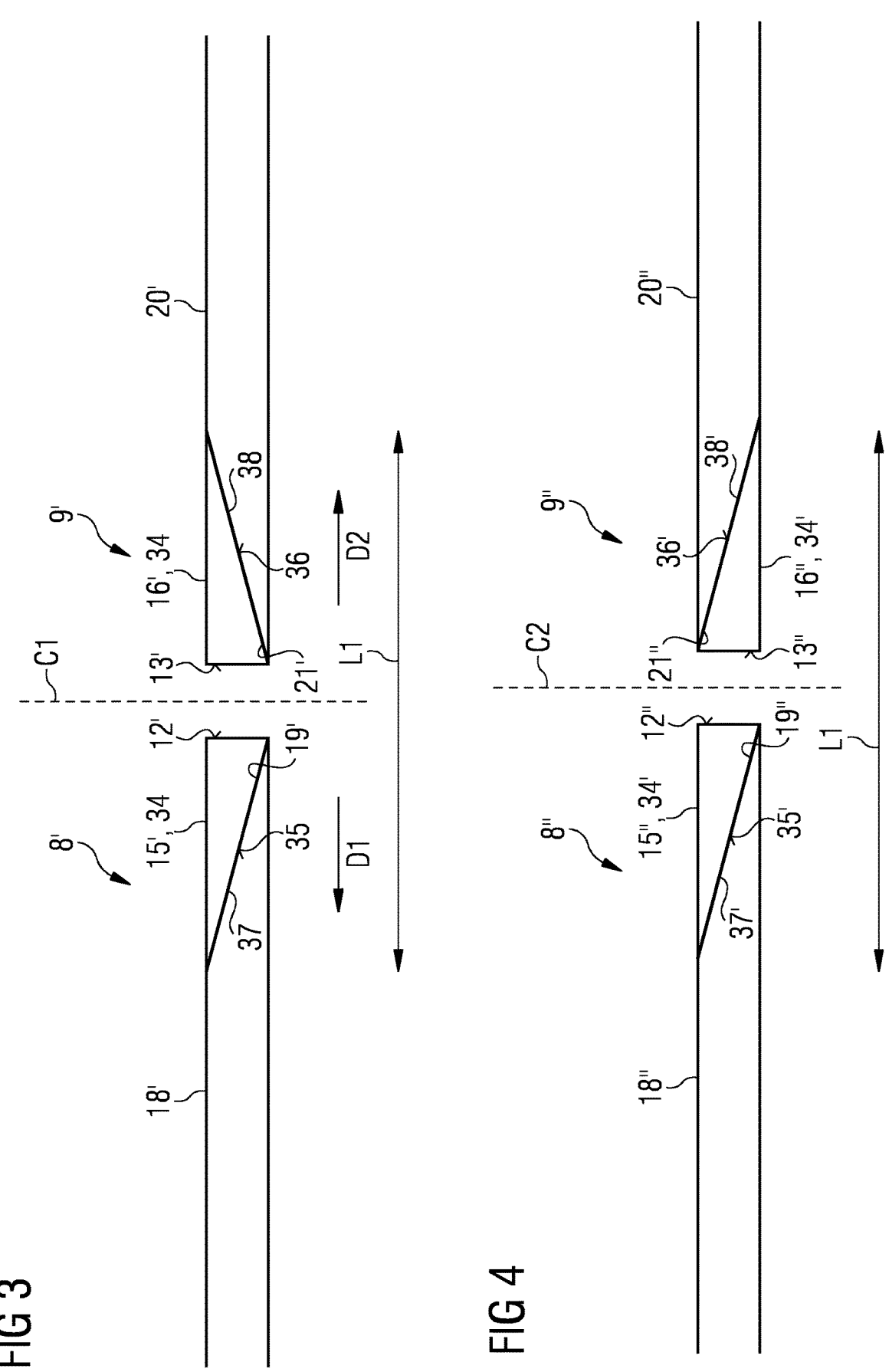

S1

S2

S11'

S12'

S2'

MANUFACTURING A WIND TURBINE BLADE WITH BUTT JOINTED PLANKS

This application is a national stage of PCT Application No. PCT/EP2022/081915, having a filing date of Nov. 15, 2022, which claims priority to EP application No. 21211701.4, having a filing date of Dec. 1, 2021, the entire contents both of which are hereby incorporated by reference.

FIELD OF TECHNOLOGY

The following relates to wind turbine blade and a method for manufacturing a wind turbine blade.

BACKGROUND

In manufacturing a wind turbine blade, it may be required to join two stiff structures, for example two load carrying structures. The structures may, for example, be planks comprising carbon or glass fibers. In embodiments, for a blade manufactured by joining two or more lengthwise blade sections, it may be required to join longitudinal beam sections or spar sections of the blade with each other. Such longitudinal beam sections or spar sections may comprise several planks arranged in a stack.

Joining two planks in a butt joint allows an easy handling and accurate placement of the planks. By joining two planks in a butt joint, end faces of the planks are simply placed next to each other without any special shaping of the end portions of the planks. However, joining two stiff components in a butt joint may result in high strain concentrations around the joint.

SUMMARY

An aspect relates to an improved wind turbine blade and an improved method for manufacturing a wind turbine blade.

Accordingly, a wind turbine blade is provided. The wind turbine blade comprises two planks joined with each other in a longitudinal direction of the planks at joining surfaces by a butt joint. Each plank comprises a main portion with a wedge-shaped recess and a wedge-shaped portion filling the recess. Further, each wedge-shaped portion has a respective one of the joining surfaces and is tapered from its joining surface in a direction away from its joining surface. Furthermore, a stiffness of a material of the wedge-shaped portions is smaller than a stiffness of a material of the main portions.

Joining the two planks by a butt joint allows an easy handling and accurate placement and alignment of the planks. Further, by having the wedge-shaped portions with the material with the smaller stiffness at the joint interface between the two planks, the stiffness of the plank decreases slowly from the joint interface (i.e., the respective joining surface) in the directions away from the joint interface. Thus, the load is transferred to the surrounding material (in particular the surrounding material above and below the two planks) over a larger area which reduces the stress concentration.

The two planks joined with each other in their longitudinal direction by the butt joint may, for example, be part of a larger structure containing multiple layers of load carrying planks and/or elements arranged in a stack (i.e., in a direction perpendicular to the longitudinal direction of the planks). Then, the load from the two planks joined with each other by the butt joint is transferred to a layer above and/or below the two planks over a larger area compared to the case of joining two planks by a butt joint without having the wedge-shaped portions with the material of smaller stiffness.

The two planks comprise, in particular, a first plank with a first joining surface and a second plank with a second joining surface. Further, the first and second planks are joined with each other in the longitudinal direction of the first and second planks at their respective joining surfaces by the butt joint. Further, the first plank comprises a first wedge-shaped portion having the first joining surface and being tapered from the first joining surface in a direction away from the first joining surface, and the second plank comprises a second wedge-shaped portion having the second joining surface and being tapered from the second joining surface in a direction away from the second joining surface.

The smaller stiffness of the material of the first and second wedge-shaped portions compared to the stiffness of the material of the main portions includes, for example, that an elastic modulus of the material of the first and second wedge-shaped portions is smaller than an elastic modulus of the material of the main portions. In an embodiment, the elastic modulus in the longitudinal direction of the material of the first and second wedge-shaped portions is smaller than the elastic modulus in the longitudinal direction of the material of the main portions. The stiffness (in particular elastic modulus) may refer to an average or maximum stiffness where the material (of the wedge-shaped portions and/or the main portions) is a combination of different components such as resin and fibers. The average stiffness may be formed over a sectional area of, e.g., 1 mm$^2$ or 1 cm$^2$. The maximum stiffness refers to the component in the material with the highest stiffness (elastic modulus) among all the components making up the (respective) material.

The wind turbine blade is provided to become part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected to a foundation of the wind turbine such as a monopile in the seabed.

In the installed state of the wind turbine, the blade, e.g., a root portion of the blade, is, for example fixedly or rotatably connected to the hub. The wind turbine blade is, for example, directly bolted to the hub, or is connected via a pitch bearing to the hub. The pitch bearing is configured to adjust the angle of attack of the blade according to the wind speed to control the rotational speed of the blade.

Apart from the essentially cylindrical root portion configured for connection with the hub, the outer surface of the wind turbine blade has an aerodynamically shaped cross section (airfoil). The aerodynamically shaped cross section of the wind turbine blade comprises, for example, a pressure side (upwind side) and a suction side (downwind side). The pressure side and the suction side are connected with each other at a leading edge and a trailing edge.

A blade shell of the blade is, for example, manufactured from fiber-reinforced resin. The blade shell is, for example, manufactured by vacuum-infusion of resin into a dry fiber lay-up and curing the resin. However, the blade shell may also be manufactured by a different method. The blade shell has, in particular, an outer surface and an inner surface, wherein the outer surface defines the aerodynamic profile of the blade, and the inner surface defines an inner cavity of the blade.

The blade may include load carrying structures such as longitudinally extending beams or spars. Such longitudinally extending beams or spars may include the two planks joined with each other in the longitudinal direction of the planks, i.e., in the longitudinal direction of the blade.

The two planks are, in particular, longitudinally extended load carrying structures of the blade. The longitudinal direction of the two planks is, in particular, a longitudinal direction of the blade. The two planks are, in particular, covered by the blade shell such that the blade has a smooth aerodynamically shaped outer surface.

The joining surfaces are, in particular, flat surfaces. The joining surfaces are, for example, arranged perpendicular to the longitudinal direction of the planks. Further, the first joining surface of the first plank matches, for example, the second joining surface of the second plane with respect to size, orientation and/or surface roughness.

The wedge-shaped portion of each plank fills, for example, the respective wedge-shaped recess of the same plank completely. In other words, a portion of each plank at the joining interface is replaced with a softer material in order to improve the transfer of loads at the joint.

Each wedge-shaped portion is tapered from its joining surface in a direction away from its joining surface. In embodiments, each wedge-shaped portion is tapered from its joining surface in a direction parallel to the longitudinal direction of the planks.

The stiffness of the material of the wedge-shaped portions is smaller than the stiffness of the material of the main portions. In embodiments, the stiffness of the material of the wedge-shaped portions is small enough such that loads are carried predominantly and/or solely through the main portions but not through the wedge-shaped portions.

According to an embodiment, each wedge-shaped portion has, as seen in cross section along the longitudinal direction, a shape of an isosceles triangle with its joining surface being a base of the isosceles triangle.

Having the wedge-shaped portions with a cross section of an isosceles triangle allows a transfer of loads at the joint interface to a layer above the two planks as well as a layer below the two planks. For example, loads are transferred in equal parts to the layer above the two planks and to the layer below the two planks. The wedge-shaped portion in this embodiment may also be called a double-wedge portion.

In embodiments, each wedge-shaped portion comprises, as seen in cross section along the longitudinal direction, two tapered surfaces each tapered in a direction away from the joining surface. Further, the joining surface and the two tapered surfaces of a respective wedge-shaped portion form, as seen in cross section along the longitudinal direction, the isosceles triangle. The legs of an isosceles triangle are by definition of equal length. Further, the legs of the isosceles triangle are formed by two tapered surfaces.

According to a further embodiment, each wedge-shaped portion has, as seen in cross section along the longitudinal direction, a shape of a right-angled triangle with its joining surface being a cathetus of the right-angled triangle.

By arranging the two wedge-shaped portions symmetrically or asymmetrically, the load transfer at the joint can be adjusted.

Each wedge-shaped portion comprises in particular, as seen in cross section along the longitudinal direction, one single tapered surface tapered in a direction away from the joining surface. Further, this tapered surface forms a hypotenuse of the right-angled triangle.

According to a further embodiment, the wedge-shaped portion of a first one of the two planks and the wedge-shaped portion of a second one of the two planks are arranged symmetrically with respect to a symmetry axis being parallel to the joining surfaces.

Thus, the tapered surface (hypotenuse) of a first one of the wedge-shaped portions and the tapered surface (hypotenuse) of a second one of the wedge-shaped portions are facing the same layer either above or below the two planks.

Having the wedge-shaped portions with a cross section of a right-angled triangle and arranged symmetric to each other allows a transfer of loads at the joint interface predominantly and/or solely to either a layer above the two planks or a layer below the two planks.

According to a further embodiment, the wedge-shaped portion of a first one of the two planks and the wedge-shaped portion of a second one of the two planks are arranged asymmetrically with respect to an axis being parallel to the joining surfaces.

Thus, the tapered surface (hypotenuse) of a first one of wedge-shaped portions faces a layer above the two planks and the tapered surface (hypotenuse) of a second one of the wedge-shaped portions faces a layer below the two planks or vice versa.

According to a further embodiment, the main portions of the planks comprise carbon fibers and/or glass fibers.

The planks are, for example, pultruded carbon profiles.

According to a further embodiment, the wedge-shaped portions of the planks comprise a foam material, a closed cell foam material, a polymeric foam, PET foam, PVC foam, PUR foam, wood and/or balsa wood.

Having a closed cell foam avoids uptake of resin during a resin infusion process.

According to a further embodiment, each wedge-shaped portion is tapered from its joining surface in a direction away from its joining surface with a ratio of 1:3 or smaller, 1:4 or smaller, 1:10 or smaller and/or 1:100 or smaller.

Having a smaller ratio of the tapered shape (shallower taper) allows to transfer loads to the surrounding material over a larger area. However, wedge-shaped portions with a very small taper ratio are difficult to machine, as it requires, for example, a very narrow saw blade. On the other hand, wedge-shaped portions with a larger taper ratio (steeper taper) can be easier manufactured. Hence, the taper ratio can be selected by taking into account the load transferring requirements and the manufacturing requirements.

The taper ratio is the ratio of a thickness of the wedge-shaped portion (i.e., the size of the wedge-shaped portion perpendicular to the longitudinal direction of the planks) and a length of the wedge-shaped portion (i.e., the size of the wedge-shaped portion parallel to the longitudinal direction of the planks).

According to a further embodiment, the two joined planks comprise a first plank and a second plank, and the wind turbine blade comprises a first spar section that includes multiples of the first plank arranged in a stack and a second spar section that includes multiples of the second plank arranged in a stack, the second spar section being joined to the first spar section by multiple butt joints between the multiple first planks and the multiple second planks.

For example, the wind turbine blade comprises a first lengthwise blade section having the first spar section and a second lengthwise blade section having the second spar section, the second blade section being joined to the first blade section in a joint.

According to a further embodiment, the multiple butt joints of the multiple first and multiple second planks are arranged at staggered positions with respect to the longitudinal direction of the planks.

By having the butt joints of the different layers at staggered positions a non-monotonically varying bond line is achieved. Hence, the two spar sections are connected with each other by a stronger joint.

The multiple butt joints are arranged, for example, at staggered positions such that a zig-zag bond line is achieved.

According to a further aspect, a wind turbine comprising the above-described wind turbine blade is provided.

According to a further aspect, a method for manufacturing a wind turbine blade is provided. In embodiments, the method comprises the steps of providing two planks each comprising a main portion with a wedge-shaped recess and a wedge-shaped portion filling the recess, wherein each wedge-shaped portion has a joining surface and is tapered from its joining surface in a direction away from its joining surface, and a stiffness of a material of the wedge-shaped portions is smaller than a stiffness of a material of the main portions, and joining the two planks with each other in a longitudinal direction of the planks at the joining surfaces by a butt joint.

According to an embodiment of the further aspect, the main portions of the planks comprise a fiber lay-up, and the main portion and the wedge-shaped portion of a respective plank are joined with each other by infusing the fiber lay-up with resin and curing the resin.

Each plank comprising the main and the wedge-shaped portion may be a pre-manufactured element. Alternatively, the main portion and the wedge-shaped portion of a respective plank may be joined with each other simultaneously with joining of two planks.

The main portions of the planks comprising a fiber lay-up includes cases wherein the main portion comprises a dry or semi-dry fiber lay-up which is infused with resin as well as cases wherein the main portion is a pre-casted element to which a dry or semi-dry fiber lay-up is added which is then infused with resin.

According to a further embodiment of the further aspect, the two planks comprise a fiber lay-up in a joining region and are joined with each other by infusing the fiber lay-up with resin and curing the resin.

According to a further embodiment of the further aspect, the two planks comprise a first plank and a second plank, and the method comprises the steps of providing a first spar section that includes multiples of the first plank arranged in a stack, providing a second spar section that includes multiples of the second plank arranged in a stack, and joining the first spar section with the second spar section by joining the multiple first and multiple second planks with each other by the multiple butt joints.

According to a further embodiment of the further aspect, in a single resin infusion and curing process:

the main portion and the wedge-shaped portion of a first one of the two planks or of each of the multiple first planks are joined with each other, the main portion and the wedge-shaped portion of a second one of the two planks or of each of the multiple second planks are joined with each other, and/or the first one and the second one of the two planks are joined with each other or the multiple first planks are joined with the multiple second planks.

The multiple first planks being joined with the multiple second planks includes that the first spar section is joined with the second spar section.

The single resin infusion and curing process may also include the step of joining a first lengthwise blade section comprising the first spar section with the multiple first planks with a second lengthwise blade section comprising the second spar section with the multiple second planks.

The single resin infusion and curing process may also include the step of forming a blade shell of the first and/or second blade section by infusing a fiber lay-up of the first and/or second blade section with resin and curing the resin.

The resin infusion described in this application may include vacuum-assisted resin infusion.

The embodiments and features described with reference to the wind turbine blade of embodiments of the present invention apply mutatis mutandis to the method of embodiments of the present invention.

Further possible implementations or alternative solutions of embodiments of the invention also encompass combinations that are not explicitly mentioned herein of features described above or below with regard to the embodiments. The person skilled in the conventional art may also add individual or isolated aspects and features to the most basic form of embodiments of the invention.

BRIEF DESCRIPTION

Some of the embodiments will be described in detail, with reference to the following figures, wherein like designations denote like members, wherein:

FIG. 3 shows a cross section view of two planks of a blade of the wind turbine of FIG. 1 according to a second embodiment;

FIG. 4 shows a cross section view of two planks of a blade of the wind turbine of FIG. 1 according to a third embodiment;

DETAILED DESCRIPTION

Figure 1:
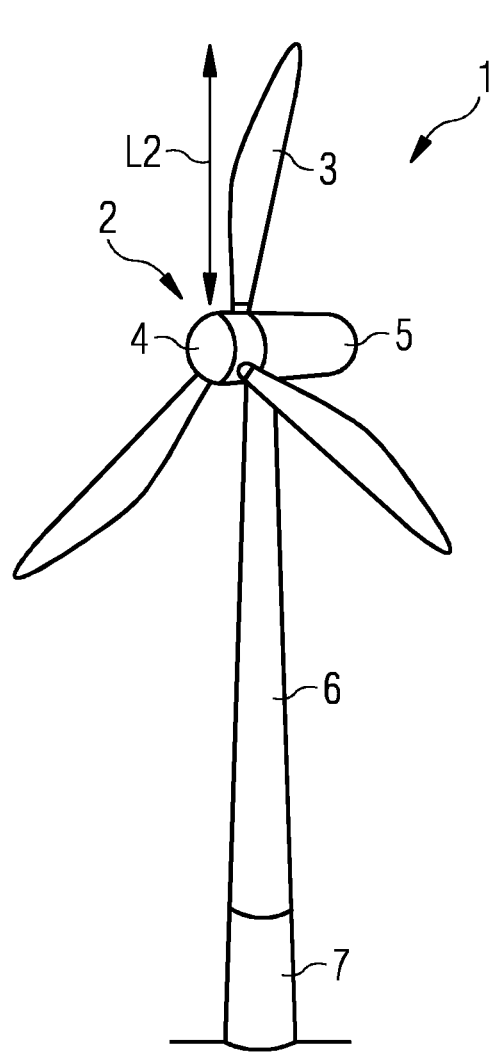
FIG. 1 shows a wind turbine according to an embodiment.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a concrete foundation or a monopile driven into the ground or seabed.

Figure 2:
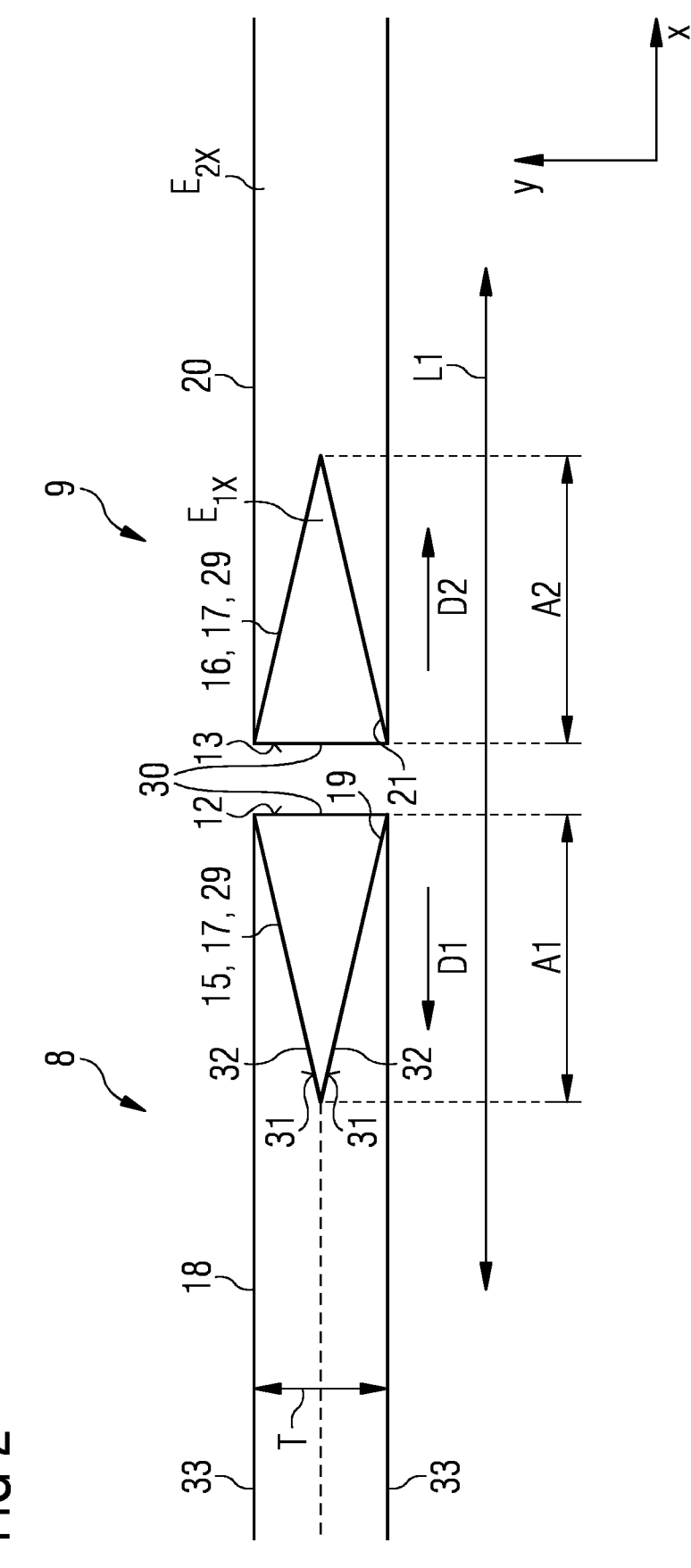
FIG. 2 shows a cross section view of two planks of a blade of the wind turbine of FIG. 1 according to a first embodiment.
Figure 5:
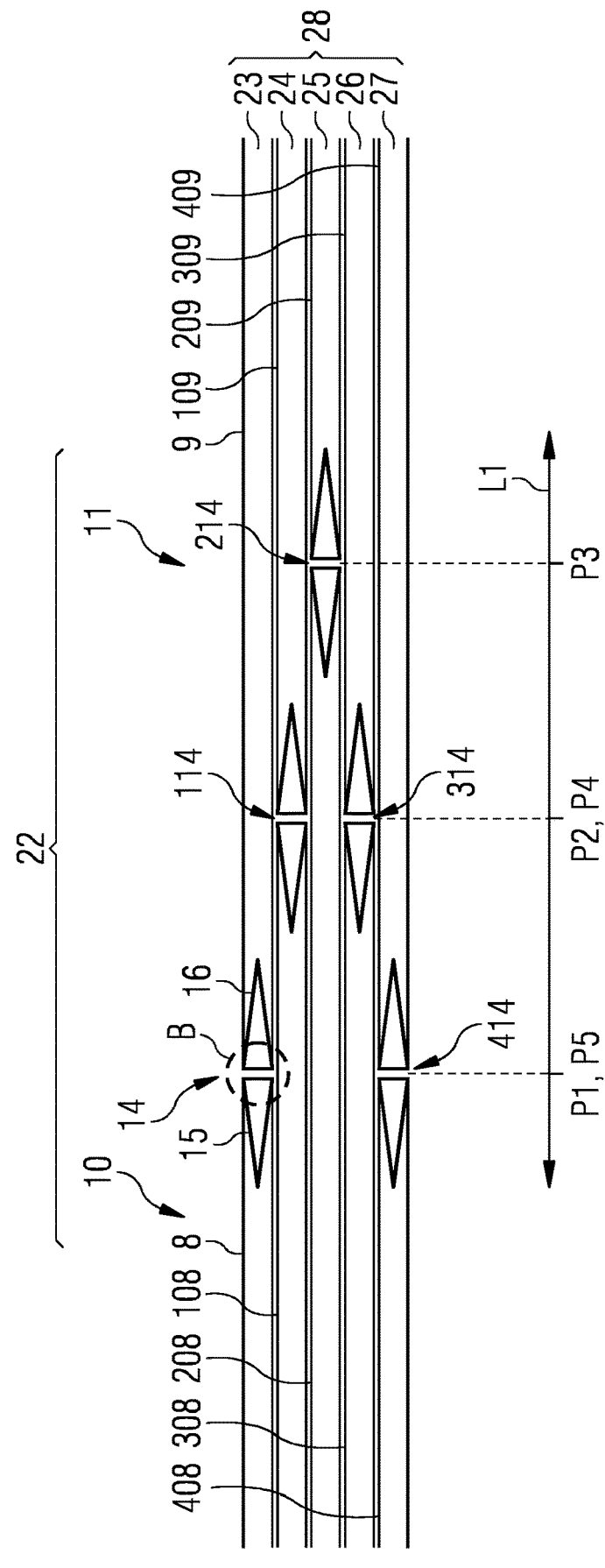
FIG. 5 shows a cross section view of a spar element of a blade of the wind turbine of FIG. 1 according to an embodiment, the spar element comprising the two planks shown in FIG. 2.

FIG. 2 shows a cross section view of two planks 8 and 9 of a blade 3 of the wind turbine 1 of FIG. 1 according to a first embodiment. A first plank 8 of the two planks 8, 9 may be part of a first spar section 10 of the blade 3 (FIG. 5). Further, a second plank 9 may be part of a second spar section 11 of the blade 3.

The first and second planks 8, 9 are, in particular, longitudinal elements extended in a longitudinal direction L1 (FIG. 2). The longitudinal direction L1 of the planks 8, 9 is, for example, parallel to a longitudinal direction L2 of the blade 3 (FIG. 1).

The two planks 8, 9 are joined with each other in the longitudinal direction L1 of the planks 8, 9 at joining surfaces 12, 13 (FIG. 2) by a butt joint 14 (FIG. 5). In embodiments, a first joining surface 12 of the first plank 8 is joined with a second joining surface 13 of the second plank 9 in the butt joint 14. FIG. 2 shows the two planks 8, 9 before the joining process. FIG. 5 shows the two planks 8, 9 joined with each other in the butt joint 14.

In order to avoid high strain concentrations around the joint 14, each plank 8, 9 comprises a wedge-shaped portion 15, 16 comprising, for example, a foam material 17. In embodiments, the first plank 8 comprises a first main portion 18 having a wedge-shaped recess 19. Further, the first plank 8 comprises the wedge-shaped portion 15 filling the recess 19. The wedge-shaped portion 15 fills the recess 19 in particular completely. In addition, the second plank 9 comprises a second main portion 20 having a wedge-shaped recess 21. Further, the second plank 9 comprises the wedge-shaped portion 16 filling the recess 21, in particular completely.

The first wedge-shaped portion 15 comprises the first joining surface 12 of the first plank 8. Further, the second wedge-shaped portion 16 comprises the second joining surface 13 of the second plank 9. That means that the first and second planks 8, 9 are joined with each other by joining the first and second wedge-shaped portions 15, 16 at the joining surfaces 12, 13 in the butt joint 14 (FIG. 5).

In order to transfer the load to the surrounding material over a larger area, the wedge-shaped portions 15, 16 are tapered. In embodiments, the first wedge-shaped portion 15 is tapered from its joining surface 12 in a direction D1 away from its joining surface 12. Further, the second wedge-shaped portion 16 is tapered from its joining surface 13 in a direction D2 away from its joining surface 13. The directions D1, D2 are arranged parallel to the longitudinal direction of the planks 8, 9.

Since the wedge-shaped portions 15, 16 are tapered over a length A1, A2 and since a stiffness of a material of the wedge-shaped portions 15, 16 is smaller than a stiffness of a material of the main portions 18, 20, the load from a respective main portion 18, 20 can be transferred to the surrounding material over the entire length A1, A2 of the respective wedge-shaped portion 15, 16. For example, as indicated in FIG. 2, an elastic modulus $E_{1x}$ of the material of the first and second wedge-shaped portions 15, 16 is smaller than an elastic modulus $E_{2x}$ of the material of the main portions 18, 20, the elastic moduli $E_{1x}$ and $E_{2x}$ being elastic moduli in the longitudinal direction L1 (i.e., X-direction in FIG. 2).

For example, a spar element 22 of the blade 3 (FIG. 5) comprises several layers 23, 24, 25, 26, 27 of planks arranged in a stack 28. Then, the load can be transferred at the butt joint 14 from a first layer 23 to a second layer 24 of the spar element 22 over the length A1 (FIG. 2) of the first wedge-shaped portion 15 and the length A2 of the second wedge-shaped portion 16.

In the embodiment shown in FIG. 2, the wedge-shaped portions have, as seen in cross section along the longitudinal direction L1, a shape of an isosceles triangle 29. In embodiments, the joining surface 12 of the first wedge-shaped portion 15 forms a base 30 of the isosceles triangle 29. Further, the first wedge-shaped portion 15 comprises two tapered surfaces 31 forming, as seen in cross section along the longitudinal direction L1, two legs 32 of the isosceles triangle 29. The wedge-shaped portions 15, 16 in this embodiment may also be called double-wedge portions as they each comprise two tapered surfaces 31 each tapered in a direction D1, D2 away from the respective joining surface 12, 13.

Having the wedge-shaped portions 15, 16 with a cross section of an isosceles triangle 29 allows a transfer of loads at the joint interface 14, for example in equal parts, to a layer above the two planks 8, 9 as well as a layer 24 below the two planks 8, 9. For example, as shown in FIG. 5, loads can be transferred at the joint interface 114 of the second layer 24 of the spar element 22 to the layer 23 above (i.e., to the second plank 9 of the first layer 23) and to the layer below 25 (i.e., to the first plank 208 of the third layer 25) in equal parts.

To prepare the main portion 18, 20 (FIG. 2) of the planks 8, 9, each main portion 18, 20 may be manufactured by joining two longitudinal elements 33, as indicated exemplary by a dotted line dividing the first main portion 18 in FIG. 2. Manufacturing the main portions 18, 20 from two separate longitudinal elements 33 allows an easier machining of the recesses 19, 21 of the main portions 18, 20.

FIG. 3 shows a cross section view of two planks 8', 9' of a blade 3 of the wind turbine 1 of FIG. 1 according to a second embodiment. Each plank 8', 9' comprises a main portion 18', 20' having a wedge-shaped recess 19', 21' and a wedge-shaped portion 15', 16' filling the respective recess 19', 21'. The wedge-shaped portions 15', 16' comprise a material with a smaller stiffness, e.g., a foam material, then the material of the main portions 18', 20'.

The planks 8', 9' of the second embodiment differ from the planks 8, 9 of the first embodiment by a different shape of the recesses 19', 21' and of the wedge-shaped portions 15', 16'. In embodiments, each wedge-shaped portion 15', 16' in FIG. 3 has, as seen in cross section along the longitudinal direction L1, a shape of a right-angled triangle 34. The joining surfaces 12', 13' of the wedge-shaped portions 15', 16' are each, as seen in cross section along the longitudinal direction L1, a cathetus of the respective right-angled triangle 34.

Further, each wedge-shaped portion 15', 16' comprises, as seen in cross section along the longitudinal direction L1, one single tapered surface 35, 36 tapered in a direction D1, D2 away from the respective joining surface 12', 13'. The tapered surfaces 35, 36 form each a hypotenuse 37, 38 of the right-angled triangle 34.

In the second embodiment (FIG. 3), the wedge-shaped portion 15' of the first plank 8' and the wedge-shaped portion 16' of the second plank 9' are arranged symmetrically to each other with respect to a symmetry axis C1. The symmetry axis C1 is arranged parallel to the joining surfaces 12', 13'.

Thus, the tapered surface 35 of the first wedge-shaped portion 15' and the tapered surface 36 of the second wedge-shaped portion 16' are facing the same direction. In the shown example of FIG. 3, the tapered surfaces 35, 36 both face towards the bottom in FIG. 3. In other examples, the symmetric arrangement may also include that the tapered surfaces 35, 36 both face towards the top in FIG. 3.

Having the wedge-shaped portions 15', 16' with a cross section of a right-angled triangle 34 arranged symmetric to each other allows a transfer of loads at the joint interface predominantly and/or solely to either a layer above the two planks 8', 9' or to a layer below the two planks 8', 9'.

FIG. 4 shows a cross section view of two planks 8", 9" of a blade 3 of the wind turbine 1 of FIG. 1 according to a third embodiment. The third embodiment (FIG. 4) is a variant of the second embodiment (FIG. 3) and in the following mainly differences to the second embodiment are described.

As in the second embodiment, each plank 8", 9" comprises a main portion 18", 20" having a wedge-shaped recess 19", 21" and a wedge-shaped portion 15", 16" filling the respective recess 19", 21". The wedge-shaped portions 15", 16" comprise a material with a smaller stiffness, e.g., a foam material, then the material of the main portions 18", 20".

As in the second embodiment, each wedge-shaped portion 15", 16" has, as seen in cross section along the longitudinal direction L1, a shape of a right-angled triangle 34'.

In contrast to the second embodiment, the wedge-shaped portions 15", 16" are arranged asymmetrically with respect to each other. In embodiments, the wedge-shaped portion 15" of the first plank 8" and the wedge-shaped portion 16" of the second plank 9" are arranged asymmetrically with respect to an axis C2 being parallel to the joining surfaces 12", 13".

In the shown example of FIG. 4, the tapered surface 35' (hypotenuse 37') of the first wedge-shaped portion 15" faces to the bottom in FIG. 4 and the tapered surface 36' (hypotenuse 38') of the second wedge-shaped portion 16" faces the top in FIG. 4. In other examples, the arrangement may be vice versa such that the tapered surface 35' faces to the top in FIG. 4 and the tapered surface 36' faces to the bottom in FIG. 4.

As illustrated exemplarily for the wedge-shaped portion 15 in FIG. 2, a tapering ratio of a wedge-shaped portion 15 may be defined as the ratio between a thickness T of the wedge-shaped portion 15 and the length A1 of the wedge-shaped portion 15. The tapering ratio of each wedge-shaped portion 15, 16, 15', 16', 15", 16" may be 1:3 or smaller, 1:4 or smaller, 1:10 or smaller and/or 1:100 or smaller.

FIG. 5 shows the spar element 22 of the blade 3 (FIG. 1) comprising the first spar section 10 and the second spar section 11. The first and second spar sections 10, 11 divide the spar element 22 in the longitudinal direction L2 of the blade 3 (FIG. 1). For example, in the case that the blade 3 is assembled from two or more lengthwise blade sections (not shown), a spar element of the blade 3 such as the spar element 22 may also be assembled from two or more lengthwise spar sections such as the spar sections 10, 11. In this case, a first blade section (not shown) may comprise the first spar section 10 and a second blade section (not shown) may comprise the second spar section 11.

As shown in FIG. 5, the first spar section 10 includes multiples of the first plank 8, 108, 208, 308, 408 arranged in a stack 28. Further, the second spar section 11 includes multiples of the second plank 9, 109, 209, 309, 409 arranged in a stack 28. In the example of FIG. 5, each plank 8 to 408 and 9 to 409 comprises a wedge-shaped portion 15, 16 such as the wedge-shaped portions shown in FIG. 2. In other examples, one, more or all of the wedge-shape portions of the planks 8 to 408 and 9 to 409 in FIG. 5 may also have a shape and/or arrangement as shown in FIGS. 3 and 4. In embodiments, the uppermost layer 23 of the stack 28 of planks may comprise planks 8', 9' with wedge-shaped portions 15', 16' shaped and arranged as shown in FIG. 3. In embodiments, the hypotenuses 37, 38 may face the second layer 24. In this case, the load at a respective butt joint of the first layer 23 would be transferred predominantly and/or solely to the second layer 24 (FIG. 5). Similarly, the lowermost layer 27 of the stack 28 of planks may comprise planks with wedge-shaped portions shaped and arranged as shown in FIG. 3 but with the hypotenuses 37, 38 facing the second lowest layer 26.

The second spar section 11 is joined with the first spar section by 10 by multiple butt joints 14, 114, 214, 314, 414 between the multiple first planks 8 to 408 with the multiple second planks 9 to 409. The multiple butt joints 14, 114, 214, 314, 414 of the multiple first and multiple second planks 8 to 408 and 9 to 409 are arranged at staggered positions P1, P2, P3, P4, P5 with respect to the longitudinal direction L1 of the planks. In embodiments, the butt joint of a specific layer of the spar element 22, such as for example the butt joint 114 of the layer 24, is arranged with respect to the longitudinal direction L1 offset from the butt joined 14 of the layer 23 directly above and offset from the butt joint 214 of the layer 25 directly below the layer 24. By having the butt joints 14, 114, 214, 314, 414 of the different layers 23, 24, 25, 26, 27 at staggered positions P1 to P5 a non-monotonically varying bond line is achieved providing a stronger joint of the two spar sections 10, 11.

Figures 6, 7:
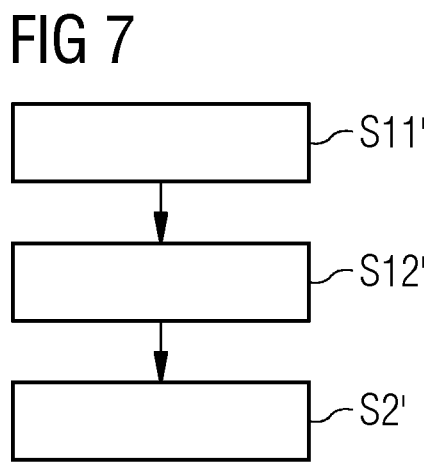
FIG. 6 shows a flowchart illustrating a method for manufacturing a blade of the wind turbine of FIG. 1 according to an embodiment.
FIG. 7 shows a flowchart illustrating a method for manufacturing a blade of the wind turbine of FIG. 1 according to a further embodiment.

In the following, a method for manufacturing a wind turbine blade 3 of the wind turbine 1 is described with respect to FIGS. 6 and 7.

In a first step S1 of the method, main portions 18, 20 of planks 8, 9 are provided. In embodiments, each of the main portions 18, 20 is machined to have a respective recess 19, 21. Further, wedge-shaped portions 15, 16 fitting into the recesses 19, 21, respectively, are provided. The main portions 18, 20 each comprise a dry or semi-dry fiber lay-up. Then, the main portion 18, 20 and the wedge-shaped portion 15, 16 of each of a respective plank 8, 9 are joined with each other by infusing the fiber lay-up with resin and curing the resin.

In a second step S2 of the method, the planks 8, 9 are joined with each other in a longitudinal direction L1 of the planks 8, 9 at joining surfaces 12, 13 of the planks 8, 9 by a butt joint 14. For example, the two planks 8, 9 each comprise a fiber lay-up in a joining region B (FIG. 5) and are joined with each other by infusing the fiber lay-up with resin and curing the resin.

Steps S1 and S2 may be carried out subsequently such that in step S1 the planks 8, 9 are pre-manufactured and in step S2 the pre-manufactured planks 8, 9 are joined with each other.

Alternatively, steps S1 and S2 may be carried out in a single resin infusion and curing process. In this case, the main portions 18, 20 and the wedge-shaped portions 15, 16 are either provided as completely separate elements or the wedge-shaped portions 15, 16 are temporarily attached to a respective main portion 18, 20, e.g., by a string, band, fabric and/or an adhesive.

As an example, the method has been described for the planks 8, 9 shown in FIG. 2. However, in embodiments the method can also be carried out for the planks 8', 9' shown in FIG. 2 or the planks 8", 9" shown in FIG. 3.

The first and second planks 8, 9 provided in step S1 of the method may also be part of first and second spar sections 10, 11 (FIG. 5).

In this case, in a step S11' (FIG. 7), a first spar section 10 is provided that includes multiples of the first plank 8, 108, 208, 308, 408 (i.e., multiples of the first main portion 18 and multiples of the first wedge-shaped portion 15) arranged in a stack 28. In step S11', each main portion 18 is joined with a corresponding wedge-shaped portion 15, for example by resin infusion of a fiber lay-up and curing the resin.

Further, in step S11', a second spar section 11 is provided that includes multiples of the second plank 9, 109, 209, 309, 409 (i.e., multiples of the second main portion 20 and multiples of the second wedge-shaped portion 16) arranged in a stack 28. In step S11', each main portion 20 is joined with a corresponding wedge-shaped portion 16, for example by resin infusion of a fiber lay-up and curing the resin.

In a step S12', the multiple layers 23, 24, 25, 26, 27 of the first spar section 10 are joined with each other, for example by resin infusion of a fiber layup and curing the resin.

Further, in step S12', the multiple layers 23, 24, 25, 26, 27 of the second spar section 11 are joined with each other, for example by resin infusion of a fiber layup and curing the resin.

Then, in a step S2', the first spar section 10 is joined with the second spar section 11 by joining the multiple first planks 8 to 408 with the multiple second planks 9 to 409, respectively, by multiple butt joints 14, 114, 214, 314, 440.

Steps S11', S12' and S2' may be carried out subsequently such that in step S11' the planks 8 to 408 and 9 to 409 are pre-manufactured, in step S12' the pre-manufactured planks 8-408 of the first spare section 10 are joined with each other and the pre-manufactured planks 9 to 409 of the second spare section 11 are joined with each other, and in step S2' the pre-manufactured first spar section 10 is joined with the pre-manufactured second spar section 11.

Alternatively, steps S11' and S12' or steps S12' and S2' or all of steps S11', S12' and S2' may be carried out in a single resin infusion and curing process. If step S11' is carried out simultaneously with step S12', the main portions 18, 20 and the wedge-shaped portions 15, 16 may be either provided as completely separate elements or the wedge-shaped portions 15, 16 may be temporarily attached to a respective main portion 18, 20, e.g., by a string, band, fabric and/or an adhesive.

Further, one, more or all of steps S11', S12' and S2' may also be carried out together with a resin infusion and curing process for forming a blade shell (not shown) of the blade 3 and/or for joining the spar element 22 of the blade 3 with the blade shell.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, comprising two planks joined with each other in a longitudinal direction of the two planks at joining surfaces by a butt joint, wherein:
   each plank comprises a main portion with a wedge-shaped recess and a wedge-shaped portion filling the wedge-shaped recess;
   each wedge-shaped portion has a respective one of the joining surfaces and is tapered from its joining surface in a direction away from its joining surface; and
   a stiffness of a material of the wedge-shaped portions is smaller than a stiffness of a material of the main portion;

wherein the wedge-shaped portions are joined together with each other at the joining surfaces;
   wherein the two planks are joined with each other by resin infusion.

2. The wind turbine blade according to claim 1, wherein each wedge-shaped portion has, as seen in cross section along the longitudinal direction, a shape of an isosceles triangle with its joining surface being a base of the isosceles triangle.

3. The wind turbine blade according to claim 1, wherein each wedge-shaped portion has, as seen in cross section along the longitudinal direction, a shape of a right-angled triangle with its joining surface being a cathetus of the right-angled triangle.

4. The wind turbine blade according to claim 3, wherein the wedge-shaped portion of a first one of the two planks and the wedge-shaped portion of a second one of the two planks are arranged symmetrically with respect to a symmetry axis being parallel to the joining surfaces.

5. The wind turbine blade according to claim 3, wherein the wedge-shaped portion of a first one of the two planks and the wedge-shaped portion of a second one of the two planks are arranged asymmetrically with respect to an axis being parallel to the joining surfaces.

6. The wind turbine blade according to claim 1,
   wherein the main portions of the planks comprise carbon fibers and/or glass fibers.

7. The wind turbine blade according to claim 1,
   wherein the wedge-shaped portions of the planks comprise a foam material or wood.

8. The wind turbine blade according to claim 7,
   wherein the foam material is selected from the group consisting of: a closed cell foam material, a polymeric foam, PET foam, PVC foam, and PUR foam, and the wood is balsa wood.

9. The wind turbine blade according to claim 1,
   wherein each wedge-shaped portion is tapered from its joining surface in a direction away from its joining surface with a ratio of 1:3 or smaller, 1:4 or smaller, 1:10 or smaller, or 1:100 or smaller.

10. The wind turbine blade according to claim 1, wherein:
   the two joined planks comprise a first plank and a second plank, and
   the wind turbine blade comprises a first spar section that includes multiples of the first plank arranged in a stack and a second spar section that includes multiples of the second plank arranged in a stack, the second spar section being joined to the first spar section by multiple butt joints between the multiple first planks and the multiple second planks.

11. The wind turbine blade according to claim 10, wherein the multiple butt joints of the multiple first and multiple second planks are arranged at staggered positions with respect to the longitudinal direction of the planks.

12. A method for manufacturing a wind turbine blade, comprising:
   providing two planks each comprising a main portion with a wedge-shaped recess and a wedge-shaped portion filling wedge-shaped recess, wherein each wedge-shaped portion has a joining surface and is tapered from its joining surface in a direction away from its joining surface, and a stiffness of a material of the wedge-shaped portions is smaller than a stiffness of a material of the main portions, and
   joining the two planks with each other in a longitudinal direction of the planks at the joining surfaces by a butt joint, wherein the two planks comprise a fiber lay-up in a joining region and are joined with each other by infusing the fiber lay-up with resin and curing the resin.

13. The method according to claim 12, wherein the main portions of the planks comprise a fiber lay-up, and the main portion and the wedge-shaped portion of a respective plank are joined with each other by infusing the fiber lay-up with resin and curing the resin.

14. The method according to claim 12, wherein the two planks comprise a first plank and a second plank, and the method comprises providing a first spar section that includes multiples of the first plank arranged in a stack, providing a second spar section that includes multiples of the second plank arranged in a stack, and joining the first spar section with the second spar section by joining the multiple first and multiple second planks with each other by the multiple butt joints.

15. The method according to claim 14, wherein in a single resin infusion and curing process:

the main portion and the wedge-shaped portion of a first one of the two planks or of each of the multiple first planks are joined with each other, the main portion and the wedge-shaped portion of a second one of the two planks or of each of the multiple second planks are joined with each other, and/or the first one and the second one of the two planks are joined with each other or the multiple first planks are joined with the multiple second planks.

16. A wind turbine blade, comprising two planks joined with each other in a longitudinal direction of the two planks at joining surfaces by a butt joint, wherein:

each plank comprises a main portion with a wedge-shaped recess and a wedge-shaped portion filling the wedge-shaped recess;

each wedge-shaped portion has a respective one of the joining surfaces and is tapered from its joining surface in a direction away from its joining surface; and a stiffness of a material of the wedge-shaped portions is smaller than a stiffness of a material of the main portion;

wherein:

each wedge-shaped portion has, as seen in cross section along the longitudinal direction, a shape of an isosceles triangle with its joining surface being a base of the isosceles triangle, or each wedge-shaped portion has, as seen in cross section along the longitudinal direction, a shape of a right-angled triangle with its joining surface being a cathetus of the right-angled triangle.

* * * * *